SINGLE FREQUENCY COMMUNICATION REPEATER
Filed Aug. 2, 1967
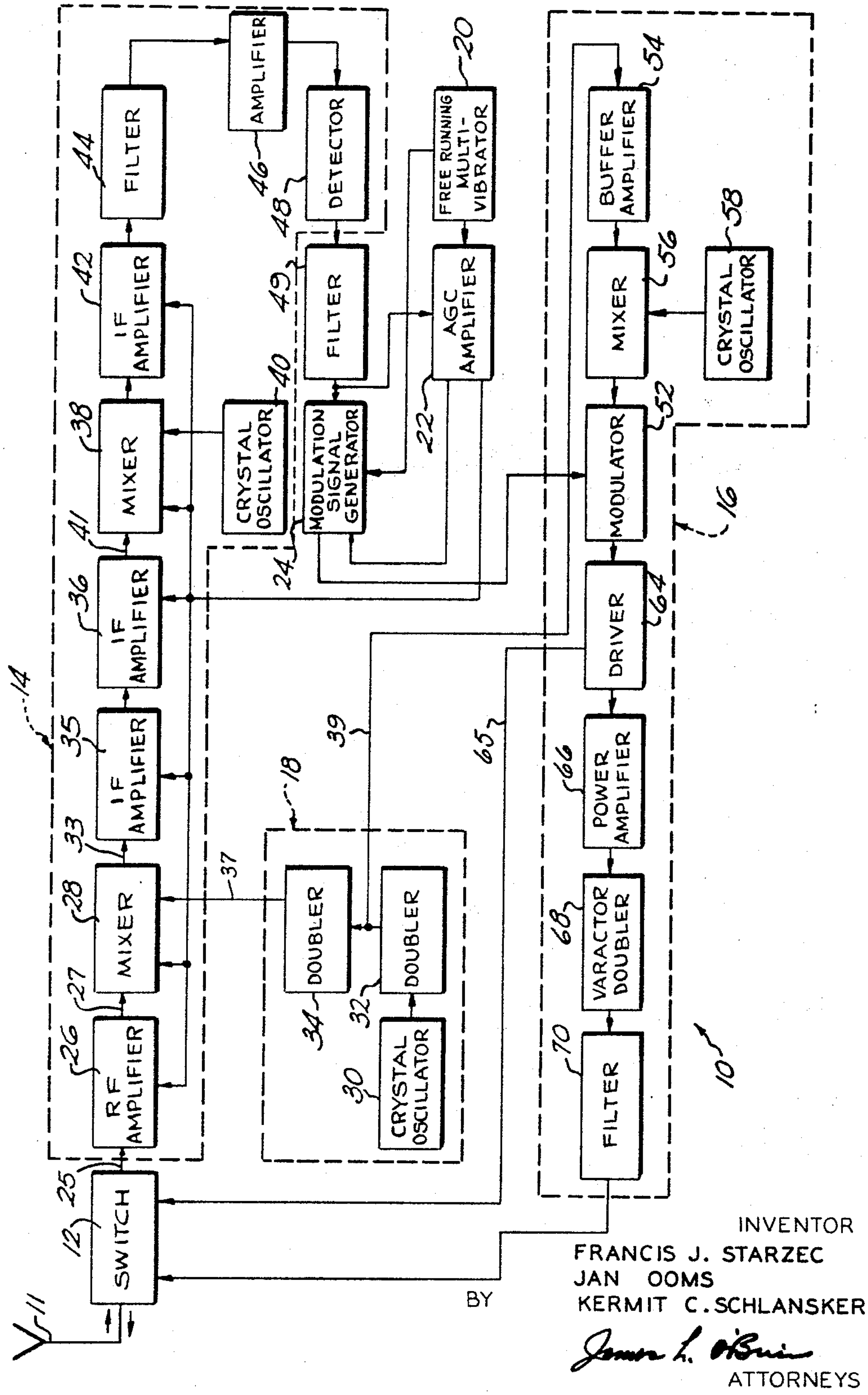
INVENTOR
FRANCIS J. STARZEC
JAN OOMS
KERMIT C. SCHLANSKER
BY
James L. O'Brien
ATTORNEYS United States Patent Office 3,448,383
Patented June 3, 1969

3,448,383

SINGLE FREQUENCY COMMUNICATION REPEATER

Francis J. Starzec, Jan Ooms, and Kermit C. Schlansker, Ann Arbor, Mich., assignors to The Bendix Corporation, a corporation of Delaware Filed Aug. 2, 1967, Ser. No. 657,872
Int. Cl. H04b 7/16
U.S. Cl. 325—8 4 Claims

ABSTRACT OF THE DISCLOSURE

A radio frequency repeater receives and transmits at substantially a single frequency on a time sharing basis. The repeater is switched between receive and transmit at a higher than audio frequency by a continuously operating switching means and includes a device to attenuate the signal to the receiver when the transmitter is active and means for using the detected signal from the receiver during the receiving interval to modulate the carrier frequency of the transmitter during the next succeeding transmit interval so as to maintain the modulation substantially identical with the received signal modulation.

*Cross-reference to related applications*

This invention is an improvement on the repeater shown in U.S. application Ser. No. 397,993, filed Sept. 21, 1964, now abandoned, and owned by the assignee of this application.

*Background of the invention*

This invention relates to communication signal repeating stations which transmit and receive alternately using a common frequency on a time sharing rate that is higher than audio frequency range. The invention particularly relates to those repeaters whose frequency is in the line of sight range and may include both frequency modulated and amplitude modulated repeaters.

*Summary of the invention*

This invention is a single frequency communication repeater in which a free-running multivibrator switches the circuit from transmit to receive and back again at higher than audio frequency. The transmitter and receiver use a common antenna with a high impedance automatically placed in the receiving circuit when the transmitter is active to block the transmitter signal from the receiver. The circuit also uses a common oscillator both as a local oscillator signal generator for the receiver and for generating the reference signal for the transmitter. This reference signal is then mixed with a transmitter local oscillator signal to provide the carrier frequency. The received signal detected during the receive interval is used to modulate the carrier frequency during the next transmit interval. The circuit has a time delay network that allows the detected received audio to be reconstructed and be held to permit its being used during the next interval to modulate the transmitter signal. This repeater may be used for either amplitude modulated or frequency modulated signals.

It is an object of the present invention to provide a repeater which will receive a weak signal and transmit a strong signal on the same frequency with means for switching from transmit to receive and back again at a rate higher than the audible range.

It is a further object of the present invention to provide a repeater which will permit a greater range of transmission without modification of either the basic transmitter or the ultimate receiver.

*Brief description of the drawing*

The single figure in the drawing is a schematic block diagram of the single frequency communication repeater of this invention.

*Description of preferred embodiment*

With reference to the drawing, the repeater of this invention, indicated generally at 10, is illustrated as including an antenna 11 which is used for both transmitting and receiving, an antenna switch 12, a receiver 14, a transmitter 16, and a crystal oscillator assembly 18 which generates the local oscillator signal for the receiver 14 and the reference frequency for the transmitter 16. A free running multivibrator 20 operates at higher than audio frequency to produce a gate for alternately switching the receiver 14 and the transmitter 16 into inactive condition.

The common antenna 11 is used for both transmitting and receiving. The antenna is connected to both the transmitter 16 and the receiver 14 through antenna switch 12. Normally two functions are performed by the antenna switch 12. One is to remove the effect of the transmitter output impedance from the receiver input circuit during receiving "on" time and the other is to short circuit transmitter output from the receiver during transmitter "on" time. The antenna switch 12 employs quarter wave length sections which are shorted by diodes at the moment of transmitter "turn-on." As a result most of the power from transmitter 16 will be directed to the antenna 11. The diode shorting action of the antenna switch 12 is actuated by a current pulse from the transmitter 16.

During the receive interval the signal is transmitted from the antenna 11 to the receiver 14 through antenna switch 12. An RF amplifier 26 in the receiver 14 receives the signal through conductor 25 from the switch 12 and feeds its output signal through conductor 27 into a mixer 28. The oscillator assembly 18 includes a crystal oscillator 30 which acts as both a local oscillator for the mixer 28, through doublers 32 and 34 and conductor 37, and as a source for the transmitter reference frequency through doubler 32 and conductor 39. The IF signal from the mixer 28 is then fed through conductor 33 to a pair of IF amplifiers 35 and 36 and then through conductor 41 to a second mixer 38. A signal from a second local oscillator 40 is also fed into the mixer 38 and the resultant IF frequency is amplified by an IF amplifier 42 and fed through a filter 44 to another amplifier 46 and then to a detector 48.

The output of the detector 48 passes through filter 49 and is delayed one half of the cycle of the free running multivibrator 20 so that the signal received during the receive cycle is fed to the modulation signal generator 24 during the succeeding transmit cycle. The output signal from generator 24 is fed into a transmitter modulator 52 to modulate the transmitter during the next transmit cycle. The signal from the detector 48 is also fed into the threshold automatic gain control amplifier 22 to control the magnitude of the modulation signal generated by generator 24. The time sharing multivibrator 20 feeds a gating signal into generator 24 to turn the modulation of the carrier frequency on and off and feeds a gating signal through amplifier 22 to RF amplifier 26, mixer 28, IF amplifier 36, mixer 38 and IF amplifier 42 to block a received signal during the transmit cycle and to remove the block during the receive cycle.

The transmitter reference frequency is received from the doubler 32 and is fed through conductor 39 into a buffer amplifier 54 and thence into a mixer 56. A signal from a local oscillator 58 is also fed into the mixer 56 and the resulting IF signal is fed into the modulator 52. The IF signal is here modulated by a signal from generator 24. The fully modulated signal is then fed to a driver circuit 64. The circuit 64 sends a switching pulse signal through conductor 65 to the antenna switch 12 to thereby cause the introduction of a high impedance between the receiver 14 and the antenna 11. The fully modulated transmitter signal is fed from modulator 52 through a power amplifier 66 onto a varactor doubler 68 where the frequency of the modulated signal is doubled for transmission. In this way amplification of the signal is performed at one half the transmitter frequency. The output of the doubler 68 is passed through a filter 70 into the antenna switch 12 and hence to the antenna 11.

During the normal operation of the repeater 10, the free-running multivibrator 20 makes the receiver and the transmitter alternately active at a rate greater than audio frequency. The received signal is fed through the antenna switch 12 to the receiver 14, and the detected signal is time delayed and fed into the transmitter 16 to modulate the transmitter signal during the next cycle.

From the above description it is seen that signal repeater 10 of this invention includes a receiver 14 and a transmitter 16 with the output of the receiver being used to modulate the transmitter carrier signal. The output from the receiver detector is delayed by a time interval equal to one half the multivibrator cycle so that the signal detected during a receive interval may be used to modulate the carrier frequency of the transmitter during the transmit interval.

If it is desired to use the repeater for amplitude modulated signals the receiver detector 48, the modulation signal generator 24 and the transmitter modulator 52 must be of the type normally used for amplitude modulated signals. If it is desired to use the repeater for frequency modulated signals these circuits must be of the type normally used for frequency modulated signals. Since the output of the receiver may be taken from the detector 48 and transformed into an audio signal by well known means this part of the repeater may be modified and used as a primary receiver. Since the transmitter carrier frequency may be modulated by well known means using an audio controlled modulation signal and feeding this signal into modulator 52 it is obvious to one skilled in the art that this part of the repeater may be readily modified to permit its use as a primary transmitter. Thus the present invention provides a very flexible communication apparatus which can be used both as a repeater or as a more conventional radio-transmitter, a device not previously available.

It will be understood that the single frequency communication repeater which is herein disclosed and described is presented for purposes of explanation and illustration and is not intended to indicate limits of the invention, the scope of which is defined by the following claims.

We claim:

1. A single frequency repeater comprising:

receiver means adapted to receive a modulated carrier signal for demodulating said modulated carrier signal utilizing a receiver means reference frequency to provide a demodulated signal which therefore is representative of the magnitude of the modulation of said modulated carrier signal;

transmitter means being provided with said demodulated signal for modulating a transmitter means carrier frequency according to said demodulated signal thereby fixing said transmitter means carrier frequency regardless of the carrier frequency of said received signal;

means for making said transmitter means and said receiver means active during alternate intervals which occur at a rate higher than audio frequency including means for blocking the passage of a signal to said receiver means during intervals in which said transmitter means is active; and a local oscillator connected to said receiver means and said transmitter means for establishing said receiver means reference frequency and said transmitter means carrier frequency.

2. A single frequency communication repeater as in claim 1 in which the means to make said transmitter means and said receiver means active during alternate intervals which occur at a rate higher than audio frequency is a free-running multivibrator.

3. A single frequency communication repeater as in claim 1 in which said local oscillator is a crystal oscillator, and further including a second crystal oscillator connected to said transmitter means so as to operate as a local oscillator therefor to produce the mean transmitted frequency.

4. A single frequency communication repeater as in claim 1 in which said receiver demodulates frequency modulated signals and said transmitter means frequency modulates said transmitter carrier frequency according to the demodulated signal from said receiver means.

References Cited

UNITED STATES PATENTS

| | | | |
|---|---|---|---|
| 2,407,212 | 9/1946 | Tunick | 325—7 |
| 2,533,269 | 12/1950 | Lehmann | 325—8 X |
| 3,201,691 | 8/1965 | Lyon | 325—7 X |

OTHER REFERENCES

Schwartz: "Information Transmission, Modulation, and Noise," McGraw-Hill, 1959, pp. 169–172.

RODNEY D. BENNETT, Jr., *Primary Examiner.*

CHARLES E. WANDS, *Assistant Examiner.*

U.S. Cl. X.R.

325—21